United States Patent [19]

Nolden

[11] 4,446,885
[45] May 8, 1984

[54] WALL MOUNTED MIXING VALVE

[75] Inventor: Werner Nolden, Wittlich, Fed. Rep. of Germany

[73] Assignee: American Standard, Inc., New York, N.Y.

[21] Appl. No.: 363,754

[22] Filed: Mar. 30, 1982

[30] Foreign Application Priority Data

Mar. 30, 1981 [DE] Fed. Rep. of Germany ....... 3112616

[51] Int. Cl.³ .......................... F16L 5/00; E03C 1/04
[52] U.S. Cl. .................................... 137/360; 137/359; 4/191; 4/192
[58] Field of Search ................. 137/359, 360, 357, 15, 137/315

[56] References Cited

U.S. PATENT DOCUMENTS 2,348,238  5/1944  Beeke et al. ............................ 4/192
3,010,474 11/1961  Moen ..................................... 4/192
3,938,546  2/1976  Farrell ................................. 137/359
4,356,574 11/1982  Johnson ................................ 4/191
4,393,523  7/1983  Nolden ................................. 4/192

Primary Examiner—A. Michael Chambers
Attorney, Agent, or Firm—James J. Salerno, Jr.; Robert G. Crooks; John P. Sinnott

[57] ABSTRACT

A wall mounted mixing valve having cold and warm water inlet connecting means with at least one of the connecting means being adjustably mounted in a support plate of the mixing valve so that the connecting means can be shifted parallel to the wall and the other connecting means mounted in the support plate forming a pivot bearing thereby providing means to accurately position the mixing valve with respect to the hot and cold water supply lines by adjusting the distance between the connecting means either horizontally or vertically along the wall.

5 Claims, 5 Drawing Figures

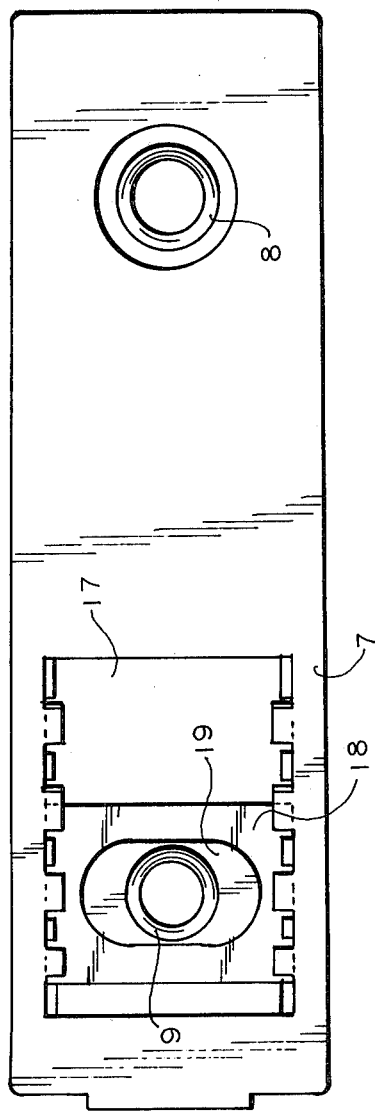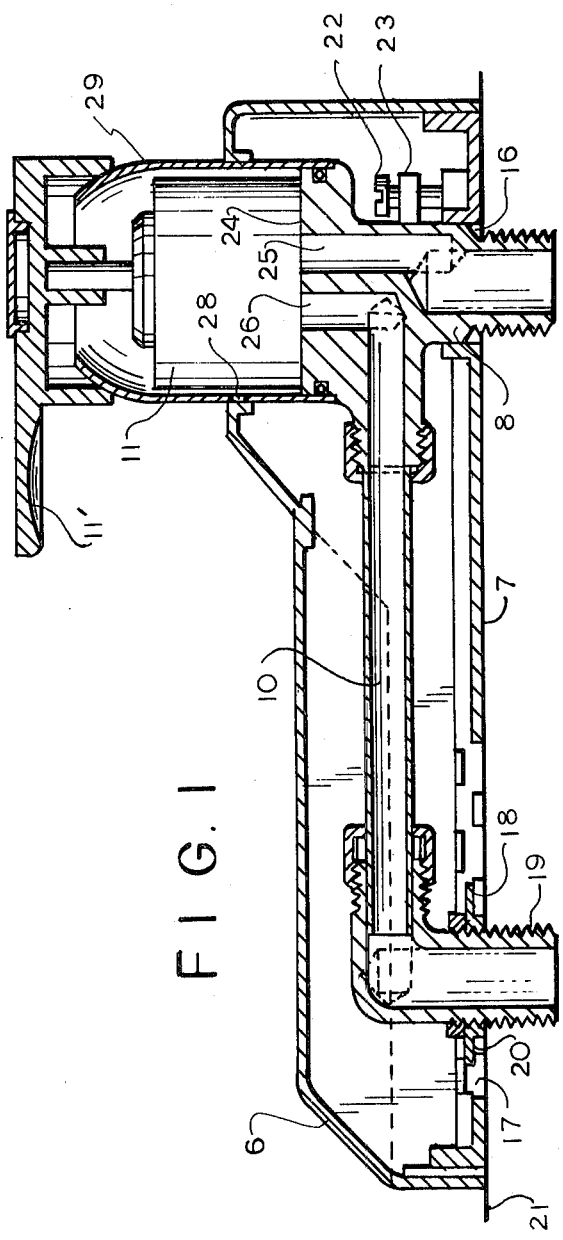

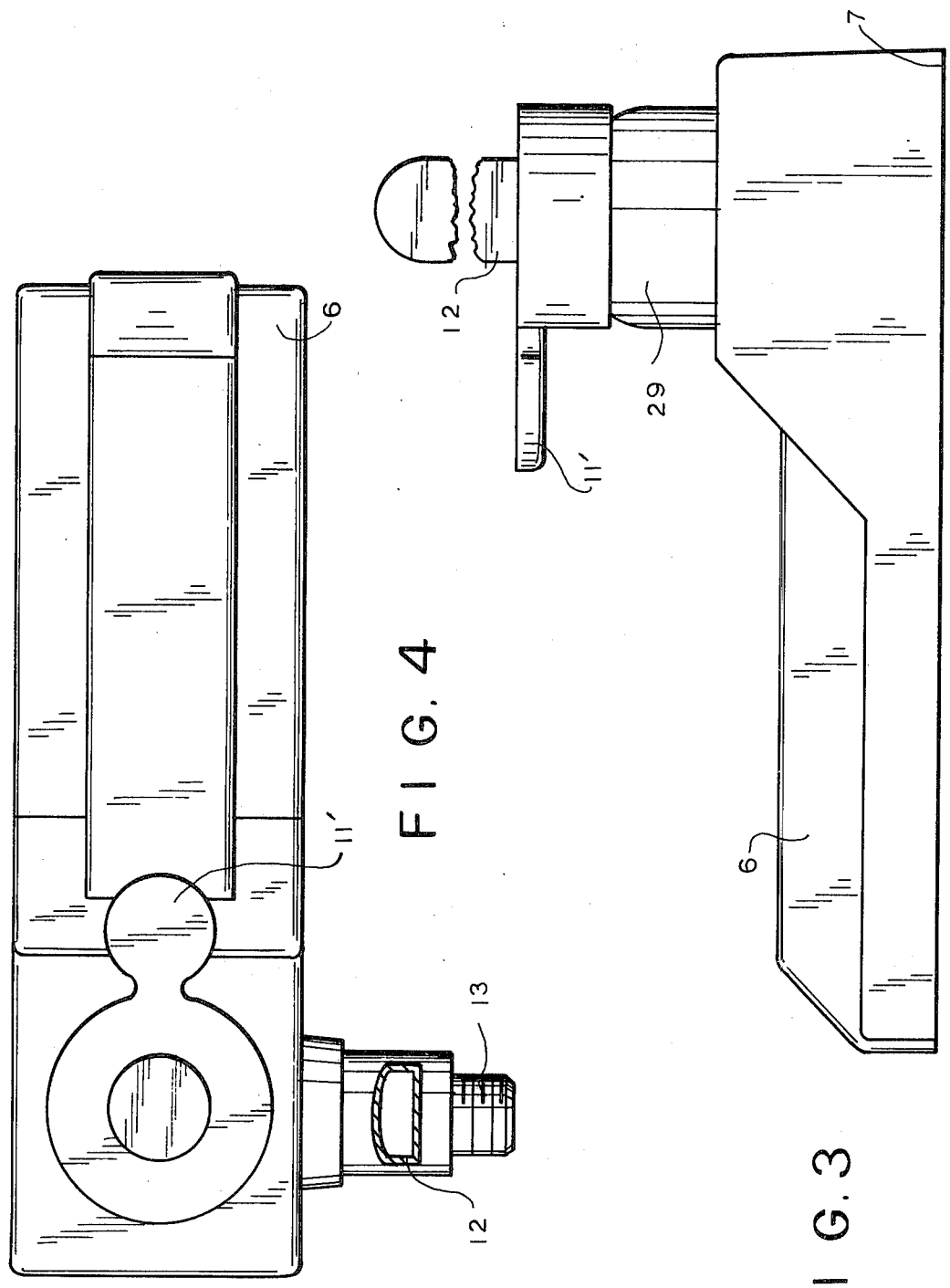

WALL MOUNTED MIXING VALVE

BACKGROUND OF THE INVENTION

The invention relates to a wall mounted mixing valve consisting of individual structural elements which are covered by a housing including at least one mixing valve assembly and one shut off element and cold and hot water inlets and a mixing water discharge outlet. The water inlets are designed in the form of connecting pieces or couplings for direct connection with the pipe ends of the water supply lines and at least one of the water inlet couplings is adjustable with respect to each other. The water inlet couplings are connected by means of a bendable pipe bridge.

DESCRIPTION OF THE PRIOR ART

Mixing valves of this type are shown and described in OS No. 25 35 427, for example, They offer without S-connections, the advantage of a simple adjustment to the actual given distances of the connecting ends of the water lines from each other. A disadvantage which can be seen in the hitherto known embodiments is that the housing which covers the individual structural elements is fixedly mounted with respect to the connecting pieces on the valve side. This means that a correction during installation of the known mixing valves cannot be made if the horizontal adjustment of the connecting ends of the water lines is not correct. In addition, the hitherto pipe bridges which constitute the connecting pieces are specially made so as to assure that the installation of the connecting pieces with respect to each other and the connecting bridges does not present any difficulties, even due to an incorrect alignment of the water discharge openings. For this purpose, the pipe bridges consist of two parts which are telescopically adjustable and are coupled to each other by means of a short hose piece made of plastic.

SUMMARY OF THE INVENTION

It is therefore an object of the invention, to eleminate these disadvantages and to provide a wall mounted mixing valve of the aforementioned type which is simple in its structure and safe in its mode of operation.

This object of the invention is advantageously achieved in that the housing is adjustable both in a horizontal direction and is rotatable about one of the inlet openings. The alignment can be adjusted accordingly and can easily be done manually by the plumber.

In accordance with a further object of the invention a pipe bridge is coupled between the hot and cold water connecting means and is manually bendable to facilitate easy adjustment for mounting of the mixing valve even when the hot and cold water lines are not correctly aligned with the two connecting means.

In accordance with still a further object of the invention, the valve housing consists of a wall side support plate and a cover plate mounted thereon.

In accordance with still a further object of the invention, the support plate is provided with two apertures for housing hot and cold water connecting means whereby one of the apertures corresponds to the outer diameter of one of the hot and cold water connecting means and which serves as a pivot bearing for rotatably mounting the support plate therearound, while the other aperture for housing the other connecting means is adjustably mounted for shifting the valve housing horizontally.

In accordance with still a further object of the invention, the aperture which houses the respective horizontally adjustable connecting piece or coupling is in turn housed in a press plate which is provided with a slotted opening. The support plate is mounted in position against the wall by a nut mounted on the coupling to bias against the press plate, while the other coupling operates with a set screw that engages the support plate through a thread opening in a lateral shoulder of the coupling which serves as the pivot bearing.

In accordance with still a further object of the invention the pivotally mounted connecting piece or coupling forms a connecting face for mounting the cartridge mixing valve and shut-off element thereon and positioned in the housing through an opening corresponding to the other diameter of the cartridge mixing valve and shut-off member.

BRIEF DESCRIPTION OF THE DRAWINGS

In the drawings an illustrative embodiment of the mixing valve herein is shown wherein:

FIG. 1 is a horizontal view of the sanitary mixing valve embodying the invention herein;

FIG. 2 is an elevational view of the mixing valve as viewed from the rear thereof;

FIG. 3 is a top plan view thereof;

FIG. 4 is a front view; and

DESCRIPTION OF THE PREFERRED EMBODIMENT

Figure 5:
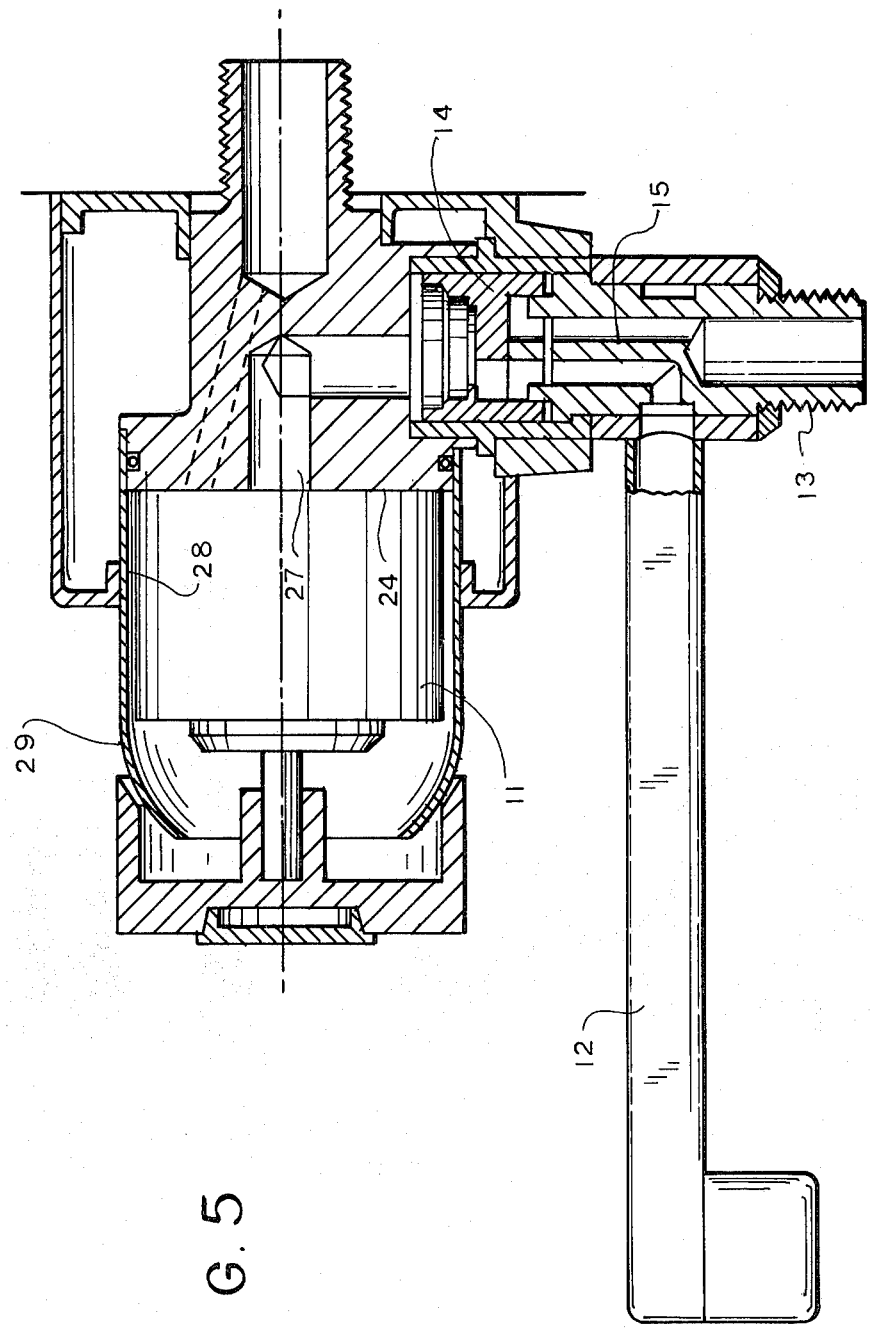
FIG. 5 is a side elevational view in section.

In the drawings, FIGS. 1 to 4, shows a mixing valve V having a cover lid which together with a support plate 7 constitutes the housing of mixing valve V. The housing 6, 7 covers two water inlet couplings 8 and 9 for a direct connection with the pipe ends of the cold and hot water lines, not shown. One of the couplings 8, 9 is adjustably mounted in plate 7 so that the distance between them can be shifted along the horizontal plane of mixing valve such as by means of manually bending pipe bridge 10. Both couplings 8, 9 are connected to a cartridge mixing valve 11 which is operated by a lever 11'. The water flows from the cartridge mixing valve 11 either through a pivotable discharge spout 12 for filling the tub or to a shower discharge outlet 13. For this purpose, the pivotable discharge spout 12 includes a disc-like control element 14 which has a diverter valve 15 which is in operative engagement with the pivotable discharge spout 12 or the shower outlet 13 depending on the position of the pivotable water discharge spout 12.

As can be seen, support plate 7 is provided with two apertures 16 and 17 for housing connecting pieces or couplings 8, 9, whereby the one aperture 16 has a diameter corresponding to the diameter of connecting piece 8. In this manner the connecting piece simultaneously serves as a pivot bearing for support plate 7. The other aperture 17, houses the other connecting piece or coupling 9 at a distance. As illustrated in FIG. 2, aperture 17 houses a press plate 18 which is formed having a slotted opening 19 for receiving the connecting piece or coupling 9. One end of support plate 7 can be screwed against the wall 21 by means of the adjustable press plate 18 with nut 20. The other end of support plate 7 is mounted against the wall by set screw 22 which engages the support plate 7 through a thread opening in a lateral shoulder 23 of the connecting piece or pivot bearing 8. As illustrated in FIG. 1, connecting piece 8 is provided with a connecting face 24 for mounting cartridge mixing valve 11 thereon. Water inlet conduits 25, 26 coupled to mixing valve 11, discharge water through conduit 27 to the diverter valve 15. The cartridge mixing valve 11 extends through an opening 28 of the cover lid 6. Opening 28 has a diameter which corresponds to the outer diameter of cover 29 for cartridge valve 11. With such a design it is possible to use a single cover for cartridge mixing valve 11.

The wall installation of mixing valve V is done in such a manner that the ends of the water supply line are coupled to the connecting ends 8, 9 that extend through support plate 7. Pipe bridge 10 is mounted between connecting ends 8, 9 and the support plate 7 is horizontally aligned and fixed in position by means of screw elements 20, 22. After mounting the support plate 7, cartridge mixing valve 11, the pivotable discharge spout 12, the diverter valve 15 and the shower outlet 13 are enclosed by cover lid 6 and the installation is operational.

As already mentioned, the shown and described embodiment is only an example for realizing the invention and is not limited thereto. In contrast thereto, other possibilities are available within the framework of the invention, in particular with respect to the arrangement and design of the individual parts. For example, the mixing valve could also be constructed as a double handle valve. Furthermore, the invention could also be used for shower valves and kitchen valves.

I claim:

1. A wall mounted mixing valve with a cold and hot water inlet and a mixing water discharge spout consisting of individual structural elements and at least one cartridge mixing valve which are covered by a housing, whereby the inlets are designed in the form of connecting pieces for a direct connection with the pipe ends of the hot and cold water lines, said connecting pieces being adjustably mounted in spaced apart position in a support plate of said mixing valve and coupled to each other by means of a separate pipe bridge, said wall mixing valve comprising: a housing for covering said structural elements is pivotably mounted on said support plate and is parallel with the wall; said support plate, including two aperatures for mounting said connecting pieces, one of said aperatures having a diameter corresponding to the diameter of said one connecting piece and said connecting piece providing a pivot bearing for mounting said support plate, and said other aperature being spaced from said one connecting piece and having a press plate adjustably mounted therein, said press plate having a slotted opening for receiving said other connecting piece and a nut coupled to said other connecting piece for mounting said support plate against the wall and said one connecting piece having a laterally extending shoulder with a threaded opening therein for receiving a set screw for connecting said support plate.

2. The wall mounted mixing valve in accordance with claim 1, wherein the housing is pivotable around the longitudinal axis of one of said connecting pieces.

3. The wall mounted mixing valve in accordance with claim 1 wherein the housing consists of a wall side support plate and a cover plate mounted thereon.

4. The wall mounted mixing valve in accordance with claim 1 wherein the side of said other connecting piece disposed opposite the wall is pivotable around the longitudinal axis of housing, and the other side of said connecting piece forming a connecting face for said cartridge mixing valve, said cartridge valve having a diameter corresponding to the diameter of the opening in said housing.

5. The wall mounted mixing valve in accordance with claim 1 wherein the pipe bridge consists of a material which is bendable and which is shaped in accordance with an angle valve pipe.

* * * * *